(12) United States Patent  
Evans et al.

(10) Patent No.: US 8,724,421 B2
(45) Date of Patent: May 13, 2014

(54) DUAL RAIL POWER SUPPLY SCHEME FOR MEMORIES

(75) Inventors: Donald A. Evans, Carroll, OH (US); Rasoju V. Chary, Bangalore (IN); Ankur Goel, Haryana (IN); Setti S. Rao, Bangalore (IN)

(73) Assignee: LSI Corporation, San Jose, CA (US)

( * ) Notice: Subject to any disclaimer, the term of this patent is extended or adjusted under 35 U.S.C. 154(b) by 49 days.

(21) Appl. No.: 13/552,020

(22) Filed: Jul. 18, 2012

(65) Prior Publication Data

US 2014/0025981 A1    Jan. 23, 2014

(51) Int. Cl.
*G11C 5/14* (2006.01)

(52) U.S. Cl.
USPC ........................................ 365/226; 365/233.5

(58) Field of Classification Search
USPC .............................................. 365/226, 233.5
See application file for complete search history.

(56) References Cited

U.S. PATENT DOCUMENTS

| 5,602,796 | A  | 2/1997 | Sugio |
| 6,426,647 | B1 | 7/2002 | Henderson |
| 7,710,796 | B2 | 5/2010 | Cottier et al. |
| 8,199,849 | B2* | 6/2012 | Oh et al. .................. 375/286 |
| 8,283,967 | B2* | 10/2012 | Chaji et al. ............... 327/390 |

* cited by examiner

*Primary Examiner* — Michael Tran
(74) *Attorney, Agent, or Firm* — Otterstedt, Ellenbogen & Kammer, LLP (57) ABSTRACT

A dual rail memory operable at a first voltage and a second voltage includes an input circuit, an output circuit and a clock generator circuit coupled with the input circuit. The input circuit is operable to receive at least a first input signal referenced to the first voltage and to generate a second input signal referenced to the second voltage. The output circuit is operable to receive at least a first output signal referenced to the second voltage and to generate a second output signal referenced to the first voltage. The clock generator circuit is operable to receive a first clock signal referenced to the first voltage and to generate a second clock signal referenced to the second voltage, a logic state of the second clock signal being a function of a logic state of the first clock signal.

21 Claims, 5 Drawing Sheets

DUAL RAIL POWER SUPPLY SCHEME FOR MEMORIES

BACKGROUND

Memory devices are prone to a phenomenon known as leakage power. Leakage power is typically dissipated by logic in the periphery and core memory arrays whenever the memory is powered on. As technology shrinks below subnanometer geometries, the leakage power dissipation in a memory device increases. This leakage power is becoming a more significant component of the total power dissipation in the memory.

One way to reduce leakage power is to reduce the power supply voltage for the memory device. However, the voltage level of a bit cell in the memory needs to be maintained at a minimum voltage specification for retention, while periphery sections of the memory device can operate below the specified voltage. As a result, dual rail power supplies have been developed where the periphery and core of a memory operate with different power supplies at different voltages, in an effort to reduce leakage power. Memories with dual rail power supplies use level shifters to isolate a high-voltage domain (e.g., VDDA) for one group of circuits from a low-voltage domain (e.g., VDD) for another group of circuits and convert signal voltages passing through the level shifters to the appropriate domain.

SUMMARY

In accordance with an embodiment of the invention, a dual rail memory operable at a first voltage and a second voltage includes at least one input circuit, at least one output circuit and a clock generator circuit coupled with the input circuit. The input circuit is operable to receive at least a first input signal referenced to the first voltage and to generate a second input signal referenced to the second voltage. The output circuit is operable to receive at least a first output signal referenced to the second voltage and to generate a second output signal referenced to the first voltage. The clock generator circuit is operable to receive a first clock signal referenced to the first voltage and to generate a second clock signal referenced to the second voltage, a logic state of the second clock signal being a function of a logic state of the first clock signal.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the present invention will be described herein in the context of an exemplary dual rail power supply architecture for a memory. It is to be appreciated, however, that the invention is not limited to the specific circuits and systems illustratively shown and described herein. Rather, embodiments of the invention are directed broadly to techniques for beneficially integrating features of a dual rail power supply in high-density memory, without regard for whether the memory is embedded or standalone. In this manner, embodiments of the invention provide a dual rail power supply scheme that can be beneficially used in a variety of memory arrangements and types, such as, for example, random access memory (RAM), static random access memory (SRAM), read-only memory (ROM), content addressable memory (CAM), flash memory, register files, and the like. Moreover, it will become apparent to those skilled in the art given the teachings herein that numerous modifications can be made to the embodiments shown that are within the scope of the present invention. That is, no limitations with respect to the specific embodiments described herein are intended or should be inferred.

As a preliminary matter, for the purposes of clarifying and describing embodiments of the invention, the following table provides a summary of certain acronyms and their corresponding definitions, as the terms are used herein:

Table of Acronym Definitions

| Acronym | Definition |
| --- | --- |
| RAM | Random access memory |
| ROM | Read-only memory |
| SRAM | Static random access memory |
| CAM | Content addressable memory |
| WL | Word line |
| ST | Self-time or self-timing |
| IO | Input/output |
| MOSFET | Metal-oxide-semiconductor field-effect transistor |
| MISFET | Metal-insulator-semiconductor field-effect transistor |
| PMOS | P-channel metal-oxide-semiconductor |
| PFET | P-channel field-effect transistor |
| NMOS | N-channel metal-oxide-semiconductor |
| NFET | N-channel field-effect transistor |
| CMOS | Complementary metal-oxide-semiconductor |
| MOS | Metal-oxide-semiconductor |
| BJT | Bipolar junction transistor |

-continued

Table of Acronym Definitions

| Acronym | Definition |
| --- | --- |
| IC | Integrated circuit |
| CPU | Central processing unit |
| ASIC | Application-specific integrated circuit |

For the purpose of describing and claiming embodiments of the invention, the term MOSFET as used herein is intended to be construed broadly and to encompass any type of metal-insulator-semiconductor field-effect transistor. The term MOSFET is, for example, intended to encompass semiconductor field-effect transistors that utilize an oxide material as their gate dielectric, as well as those that do not. In addition, despite a reference to the term "metal" in the acronym MOSFET, the term MOSFET is also intended to encompass semiconductor field-effect transistors wherein the gate is formed from a non-metal such as, for instance, polysilicon.

Although embodiments of the present invention described herein may be implemented using p-channel MISFETs (hereinafter called "PMOS" or "PFET" devices) and n-channel MISFETs (hereinafter called "NMOS" or NFET devices), as may be formed using a CMOS fabrication process, it is to be appreciated that embodiments of the invention are not limited to such transistor devices and/or such a fabrication process, and that other suitable devices, such as, for example, FinFETs, bipolar junction transistors (BJTs), etc., and/or fabrication processes (e.g., bipolar, BiCMOS, etc.), may be similarly employed, with or without modification to the circuits described herein, as will be understood by those skilled in the art. Moreover, although embodiments of the invention are typically fabricated in a silicon wafer, embodiments of the invention can alternatively be fabricated in wafers comprising other materials, including but not limited to Gallium Arsenide, Indium Phosphide, etc.

Figure 1:
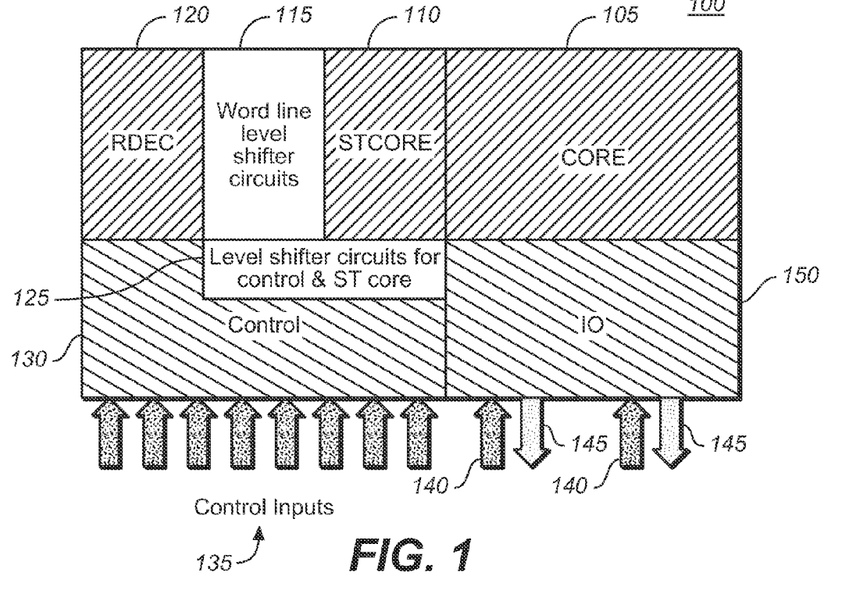
FIG. 1 is a block diagram conceptually depicting a dual rail power supply for an exemplary memory.

FIG. 1 is a block diagram conceptually depicting a dual rail power supply for an exemplary high-density memory 100. In this embodiment, a first power supply is employed having a first voltage, VDDA, and a second power supply is employed having a second voltage, VDD, that is lower than the first voltage. The memory 100 includes a core 105, a self-time (ST) core 110, word line level shifter circuits 115, row decoders (RDEC) 120, control and ST core level shifter circuits 125 including ST tracking circuitry, a control block 130, control inputs 135, data inputs 140, data outputs 145 and an input/output (IO) block 150. Memory 100 is structured so that RDEC 120, ST core 110 and core 105 operate at a higher voltage (VDDA), while control block 130 and IO block 150 operate at a lower voltage (VDD) relative to one another. It is to be understood, however, that embodiments of the invention are not limited to any specific voltage levels for VDDA or VDD. Word line level shifter circuits 115 and control and ST core level shifter circuits 125 operate at both VDD and VDDA. Memory 100 includes typical voltage level shifters to convert voltages in the higher power supply domain to voltages in the lower power supply domain, and vice versa.

Figure 2:
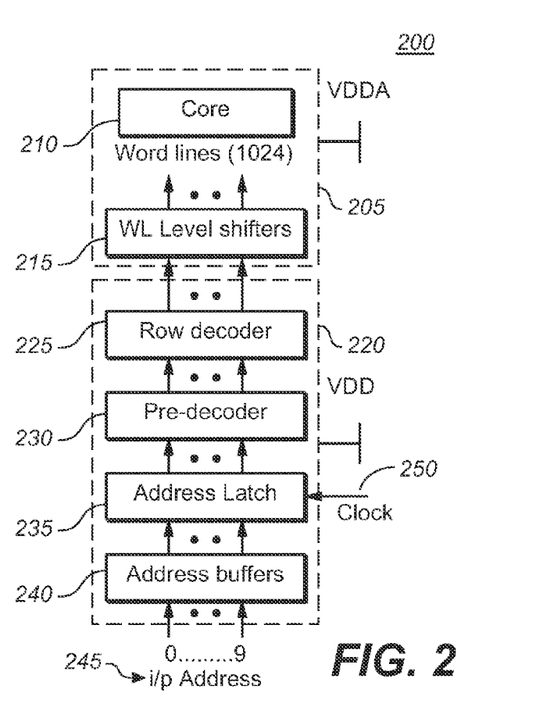
FIG. 2 is a block diagram depicting at least a portion of an exemplary address path of the illustrative memory shown in FIG. 1.

FIG. 2 is a block diagram of at least a portion of an exemplary address path 200 of the high-density memory 100 shown in FIG. 1. Included in the address path 200 of memory 100 is a lower voltage domain 220, which in this embodiment is VDD, that includes address buffers 240 adapted to receive input addresses (i/p addresses 0 to 9) 245, an address latch 235, a pre-decoder 230 and a row decoder 225. Also included in the address path 200 is a higher voltage domain 205, which in this embodiment is VDDA, that includes a core 210 and word line (WL) level shifters 215. The WL level shifters 215 are operative to shift signal voltage levels received from row decoder 225 operating in the lower voltage (VDD) domain 220 to signal voltage levels compatible for operation in the higher voltage (VDDA) domain 205. In this example, because WL level shifters 215 are located after row decoder 225 having ten address lines (receiving i/p addresses 0 through 9), the address lines 0 through 9 are decoded to 1,024 word lines, and thus 1,024 level shifter circuits are required. Generally, in the address path 200 of memory 100, WL level shifters 215 are used to shift a regular word line voltage level and a tracking word line voltage level towards a higher voltage (e.g., VDDA) and allow operating the bit lines and periphery at a lower voltage (e.g., VDD).

Notwithstanding benefits of a standard dual rail power supply scheme, there are several disadvantages, including, for example:

large area overhead for memories with a larger number of word lines. For example, a memory with a 1,024 (1K) word lines, such as the illustrative memory shown in FIG. 2, the dual rail scheme requires 1,024 level shifters to level-shift the word lines to VDDA. For high-density memories using this particular dual rail scheme, the area overhead may not be tolerable;

significant impact on performance as level shifters are directly positioned in the access time critical path;

significant yield issues due to bit-cell stability for uncorrelated VDD, VDDA power supplies, especially when the periphery voltage (VDD) is greater than the array voltage (VDDA); and poor performance due, at least in part, to a lower periphery voltage (VDD).

One example of a time-critical circuit path delayed by level shifter circuits in a dual rail system is clock signal 250, shown in FIG. 2, where the clock signal 250 passes from the lower voltage (VDD) domain 220 to the higher voltage (VDDA) domain 205 by way of WL level shifters 215. A clock generator circuit for a single supply (VDD) memory (i.e., without a level shifter circuit) does not encounter these delays because the memory only has one power supply voltage and thus does not require level shifters.

Figure 3:
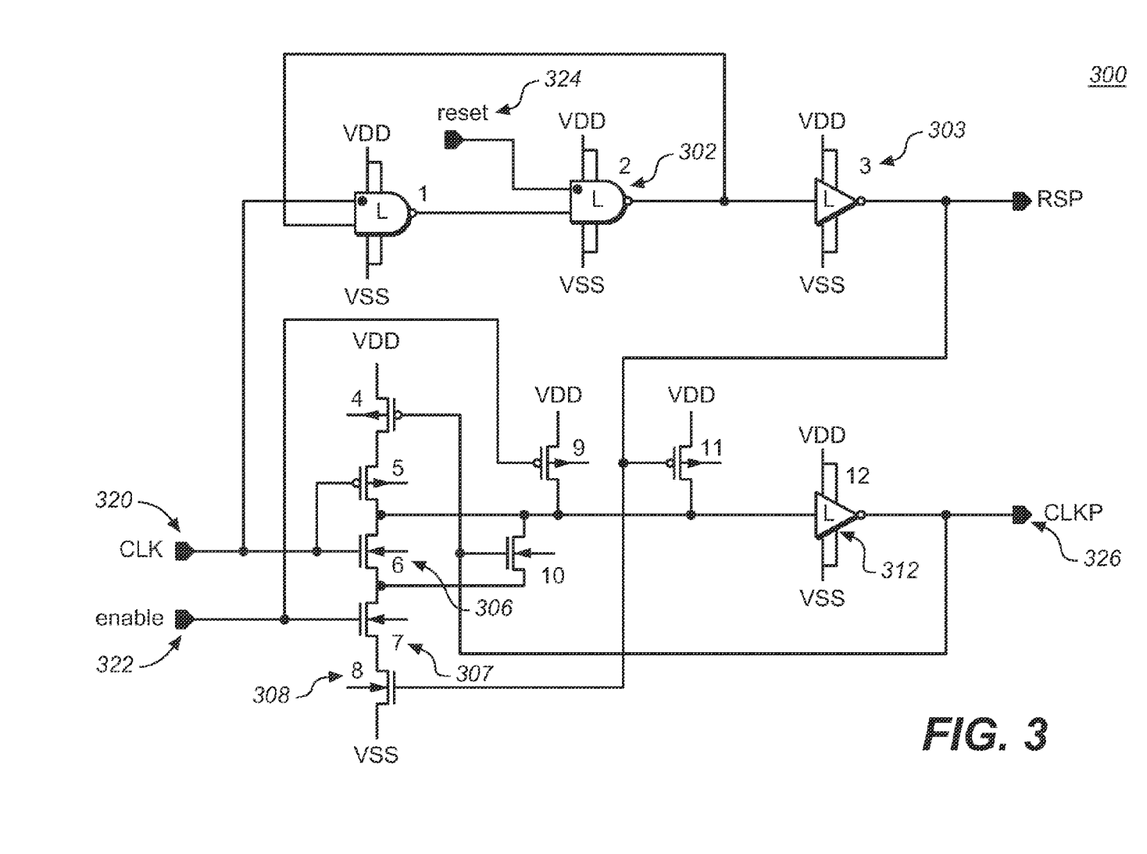
FIG. 3 is a circuit diagram of at least a portion of an illustrative clock generator circuit for a memory.

FIG. 3 is a circuit diagram of at least a portion of an illustrative clock generator circuit 300 for a memory. The clock generator circuit 300 is adapted for a single-supply (e.g., VDD) memory or adapted to operate in the VDD domain in a dual rail scheme where voltage conversion occurs later, such as in a WL level shifter. In this example, during a clock (CLK) signal low state (e.g., VSS) at input 320, an enable signal at input 322 and a reset signal at input 324 are at a logic high state (e.g., VDD). As a result, NMOS transistors 307 and 308, PMOS transistor of inverter 303 and NMOS stack of NAND gate 302 are in an ON state, thereby generating a high (e.g., VDD) RSP output signal. As soon as the clock (CLK) signal at input 320 goes to a high state (e.g., VDD), an NMOS transistor 306 and a PMOS transistor of inverter 312 are turned ON resulting in a clock pulse (CLKP) at an output 326 going high (e.g., VDD). Clock generator circuit 300 does not require level shifting because the entire memory is operating in the VDD domain, or at least clock generator circuit 300 is operating in the VDD domain, and the CLK signal at input 320 is also operating within the VDD domain. However, in a dual rail memory arrangement, such as that shown in FIG. 2, the clock signal at input 250 operating in the VDD domain would require level shifting to the VDDA domain after row decoder 225 and thus encounter additional delays caused by level shifters.

Figure 4:
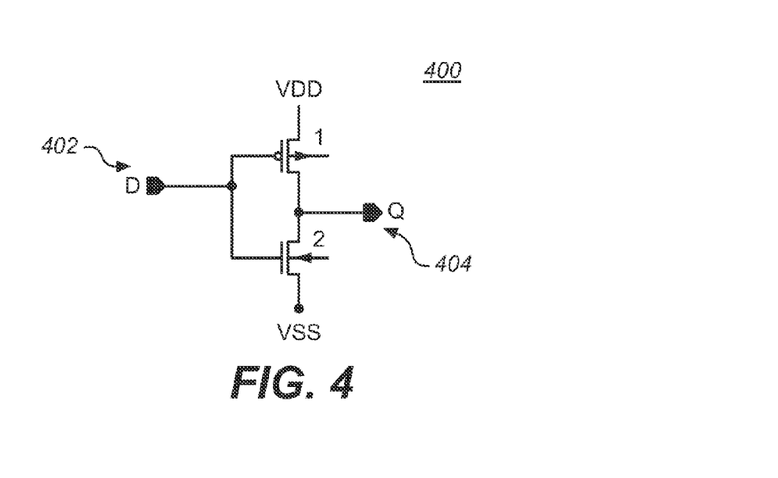
FIG. 4 is a circuit diagram of at least a portion of an illustrative output driver circuit.

FIG. 4 is a circuit diagram depicting at least a portion of an illustrative output driver circuit 400 adapted for a single supply (e.g., VDD) memory. In this example, because the entire memory, including output driver circuit 400, is operating in a single supply (e.g., VDD) domain, signal D at input 402 and signal Q at output 404 will both be at the VDD voltage level and thus, do not require level shifting to another voltage level (e.g., VDDA).

In accordance with embodiments of the invention, a memory is structured so that its core and at least a portion of its periphery circuits operate at a higher voltage (e.g., VDDA) through a single power supply, while its input receivers/buffers and output drivers/buffers operate at a lower voltage (e.g., VDD) through a periphery power supply. It is to be understood that the invention is not limited to any specific voltage levels for the lower and higher power supplies. Further, embodiments of the invention support uncorrelated power supply voltages, such as where VDD is a higher voltage than VDDA and variations in VDD do not necessarily track variations in VDDA.

Figure 5:
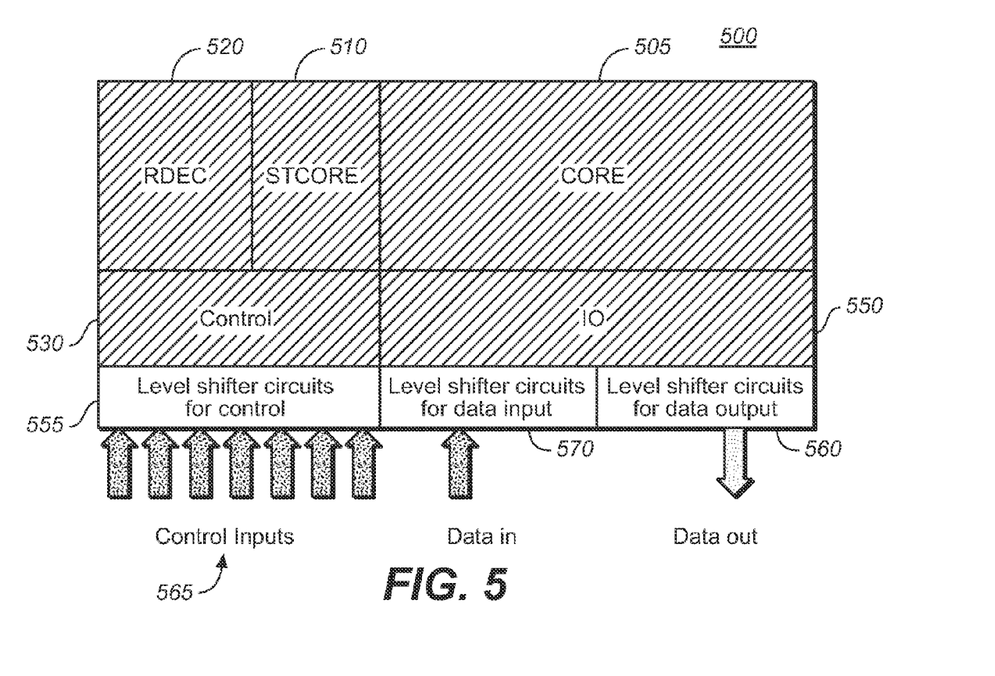
FIG. 5 is a block diagram depicting at least a portion of an exemplary memory device with a dual rail power supply scheme, in accordance with an embodiment of the present invention.

By way of example only and without loss of generality, FIG. 5 is a diagram depicting at least a portion of an exemplary memory 500 with a dual rail power supply arrangement, in accordance with an embodiment of the present invention. As apparent from FIG. 5, memory 500 comprises a core 505, a self-timing (ST) tracking core (STCORE) 510, a row decoder (RDEC) 520, a control block 530, an input/output (IO) block 550, control level shifter circuits 555, data input level shifter circuits 570, and output driver level shifter circuits 560. It should be realized that in this embodiment, input circuits, for example, input receivers/buffers and control level shifter circuits 555, are added to the existing input logic associated with the input receivers of memory 500, and output circuits, for example, output drivers/buffers and output driver level shifter circuits 560, are added to the existing output logic associated with the output drivers or buffers of memory 500. The input receivers associated with control level shifter circuits 555 include inputs for addresses and controls, and the data input receivers associated with data input level shifter circuits 570 include inputs for data. The memory layout is simplified and layout costs reduced by adding/integrating level shifters to/into input receivers and output drivers, rather than to circuitry located deeper in the memory, such as in word line drivers, and more complex circuitry, such as dual rail self-timing circuitry, shown in FIG. 1.

For example, in accordance with embodiments of the invention, level shifter circuits can be placed at all of the outputs of the input receivers/buffers or at all of the inputs to input latching circuits, and level shifter circuits can be placed at all of the inputs of the output drivers. Further, layout costs are reduced by adding the level shifter circuits to the input receivers and output drivers because a new circuit layout for the existing memory circuitry is not required. Alternatively, for example, level shifter circuits can be built into or integrated with an address receiver or latch, or a data receiver or latch, which would require some modification to the circuit layout of the memory, but little change compared to modifications to the layout of a memory incorporating shifters, such as the level shifters 125 in memory 100 (FIG. 1). It should be realized that in contrast to dual rail power systems, such as the example in FIG. 1, most of memory 500 operates within a single voltage domain, namely, the array voltage (VDDA) domain, thus simplifying the fabrication process of the memory.

In this embodiment, the dual rail power supply scheme in memory 500 is structured so that core 505, ST core 510, RDEC 520, control block 530 and IO block 550 operate at the array voltage (e.g., VDDA), while the input receivers and output drivers operate at the periphery voltage (e.g., VDD). Control level shifter circuits 555 operating at both VDDA and VDD are coupled to the input receivers of control block 530 to provide voltage level conversion between the periphery voltage level region that the control input receivers operate and the array voltage level region that control block 530 operates. Further, control level shifter circuits 555 provide voltage level conversion of signals leaving the periphery voltage level region powered by the periphery power supply (VDD) to the array voltage level region powered by the higher voltage power supply (VDDA). The control inputs include, for example, addresses, read/write enable and chip select enable. It should be realized that in this illustrative embodiment, level shifters at the input receivers are incorporated on all inputs in the asynchronous address/data setup path prior to latching the input signals, thus making sure that the access time is independent of this additional input level shifter delay. Locating the input level shifters prior to latching the input signals does not affect memory access time, as opposed to the dual rail scheme in memory 100 (shown in FIGS. 1 and 2), where WL level shifters 215 are located after address latch 235, thus affecting memory access time by adding level shifter delay.

Referring again to FIG. 5, output driver level shifter circuits 560, operating at both the higher (VDDA) voltage domain and the lower (VDD) voltage domain, are coupled to the output drivers and IO block 550 to provide voltage level conversion between the periphery voltage level region that the output drivers operate and the array voltage level region that IO block 550 operates. Further, output level shifter circuits 560 provide voltage level conversion of signals leaving the array voltage level region powered by the higher voltage power supply (VDDA) to the periphery voltage level region powered by the voltage periphery power supply (VDD). Also operating at both the VDDA domain and the VDD domain are the data input level shifter circuits 570 which are coupled with the input receivers and IO block 550 to provide voltage level conversion between the periphery voltage level region that the input receivers operate and the array voltage level region that IO block 550 operates. Data input level shifter circuits 570 provide voltage level conversion of signals entering the array voltage level region powered by the array voltage power supply (VDDA) from the periphery voltage level region powered by the voltage periphery power supply (VDD). It should be realized that embodiments of the invention reduce the required semiconductor area occupied by, for example, WL level shifter circuits 115 (shown in FIG. 1), by structuring memory 500 so that the level shifters are located at the input receivers and output drivers, thus reducing the number of level shifters and leaving more array area available in memory 500. In particular, WL level shifter circuits 115 and ST core level shifter circuits 125 (shown in FIG. 1) are not required in illustrative embodiments of the invention. Comparatively, the layout of memory 500 is easier to implement and costs less because the level shifters are not located throughout the memory.

The dual rail power supply scheme of memory 500 supports uncorrelated power supplies and thus the power supplies for the VDDA and VDD domains do not have to track one another and can vary from one another in either direction. Embodiments of the invention support uncorrelated supply voltages, such as where the magnitude of VDD is greater than the magnitude of VDDA. Some embodiments operate an array supply voltage (e.g. VDD) that is larger than the voltage of a periphery supply (e.g. VDDA). Sometimes a memory is operated with the magnitude of the array supply voltage greater or less than the magnitude of the periphery supply voltage. As previously stated, embodiments of the invention are not limited to any specific voltage magnitudes for the respective voltages of the two power supply domains. Regardless, having level shifters 215 at the word line drivers (e.g., edge of the core/array cell, shown in FIG. 2) introduces problems that restrict the use of uncorrelated supply voltages.

For example, static noise margin problems can arise when the magnitude of bit line and/or word line voltages increase to be larger than the magnitude of the array cell voltage. To prevent this from happening, the magnitude of the periphery supply voltage can be maintained at or below the magnitude of the array supply voltage. This approach is further complicated because the bit cells are somewhat straddling two voltage domains. Traditionally, a dual rail power supply memory cannot support uncorrelated power supplies; in other words, the magnitude of the voltage produced by each of the two power supplies must track one another and one cannot exceed the other by more than some small specified voltage before static noise margin is impacted. There is also the opposite case, where the bit line voltage magnitudes are very small relative to the magnitude of the power supply voltage, thus impacting static noise margin. In accordance with embodiments of the invention, level shifting is performed at the interface between control inputs 565 and control 530 and between data in/data out and IO 550 and the magnitude of the operating voltage beyond the level shifters is the same in the two poser domains, so everything interfacing with the bit cells of the array, for example the word lines and bit lines, are all operating at the same voltage. This eliminates cases where bit line voltages go above the bit cell supply voltage because they are all operating on the same supply. Having the level shifters on the periphery supports uncorrelated power supplies; that is, the supplies can vary from one another in either direction.

Figure 6:
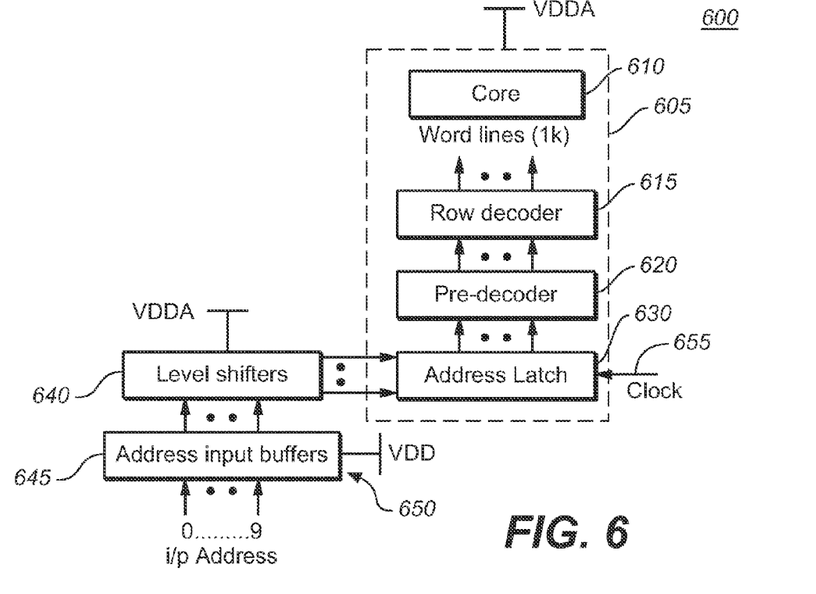
FIG. 6 is a block diagram depicting at least a portion of an exemplary address path of the illustrative memory device shown in FIG. 5, in accordance with an embodiment of the present invention.

FIG. 6 is a block diagram depicting at least a portion of an exemplary address path 600 of the illustrative memory 500 shown in FIG. 5, in accordance with an embodiment of the invention. As shown in FIG. 6, level shifter circuits 640 are included in the address path 600 of memory 500 with a dual rail scheme. The address path 600 is partitioned into a lower periphery voltage (e.g., VDD) domain 650 and a higher array voltage (e.g., VDDA) domain 605. Periphery voltage domain 650 includes address input buffers 645 adapted to receive input addresses (i/p addresses 0 to 9). Array voltage domain 605 includes an address latch 630, a pre-decoder 620, a row decoder 615 and a core 610 with 1,024 word lines. It is to be appreciated that embodiments of the invention are not limited to any specific number of word lines. Generally, in this exemplary address path 600, level shifters 640 are used to shift the address line voltage levels towards the array voltage (e.g., VDDA). Level shifters 640 shift signal voltages received from address input buffers 645 operating in the periphery voltage domain 650 to signal voltages compatible for operation in the array voltage domain 605.

In accordance with embodiments of the invention, memory access time is independent of any delay introduced by the input level shifters because level shifters 640 are located before address latch 630 (i.e., level shifters are part of the asynchronous path), as opposed to the dual rail scheme shown in FIG. 2, where level shifters 215 are included in the word line paths. Further, because level shifters 640 are located before row decoder 615, the number of level shifter circuits required in this embodiment of the invention is ten (i.e., one for each address input (0 through 9), rather than 1,024 (for each word line). Thus, the number of level shifters in this embodiment is significantly less than the number of level shifters that are required in the dual rail memory scheme shown in FIG. 2. Moreover, it should be realized that the same approach to the address inputs illustrated in FIG. 6, is applicable to inputs such as read/write enable, chip select and other data control inputs. Also shown in FIG. 6 is an input 655 adapted to receive a clock signal (Clock) for memory 600. Input 655 is part of the array voltage domain 605, which receives a clock signal shifted to the array voltage domain 605. Not explicitly shown in FIG. 6 is a clock generator, an example of which is discussed in further detail in conjunction with FIG. 7.

A typical memory cycle starts with a leading edge or rising edge of a clock signal to start various cycle processes, such as, for example, address pre-decode, etc. Normally, when level-shifting logic or a signal, the shifting involves both up and down shifting from a higher voltage domain to a lower voltage domain and vice versa. However, in this embodiment of the invention, the level shifters are operating on the active high clock so that a penalty normally associated with level shifting both edges of the clock is beneficially eliminated. Further, in accordance with an embodiment of the invention, a penalty associated with level shifting the rising edge of the clock is eliminated by the clock generator having a level shifter outside a critical path of the clock signal, for example, in a reset circuit path, thereby minimizing the overall impact to access time (discussed in detail below).

In a dual rail memory, such as memory 100 shown in FIG. 1, level shifter circuits 125 for control block 130 and ST core 125 operate at both the VDD and VDDA domains, which impacts the self-time tracking circuitry of memory 100. In memory 100, the self-time tracking circuitry of ST core 110 interfaces with control block 130 by way of level shifter circuits 125, and thus the self-time tracking signals pass through both the VDD and VDDA domains.

Typically, the self-time tracking circuitry monitors various time-sensitive operations, the load on bit lines, drive characteristics of the bit cells, etc., and determines various timing cycles, such as the time to keep a word line active or the time to wait before setting a sense amplifier for a read operation. However, operating at both the VDD and VDDA domains impacts the operation of the self-time tracking circuitry because the circuit is sensitive to voltage. For example, if an array (e.g., core 105 in FIG. 1) is connected to one voltage supply and the periphery (e.g., control 130) is connected to another voltage supply, the self-time tracking signals will speed up and slow down appropriately as a function of the two supply voltages when accessing the array, thus complicating the design of the tracking/monitoring circuitry.

As a result, additional complex design issues must be considered for the self-time tracking circuitry operating in a conventional dual rail memory system. However, in accordance with embodiments of the invention, the self-time tracking circuitry operates entirely on the VDDA supply and thus overcomes the above-mentioned disadvantages with minimal or no impact on performance. Further, in accordance with embodiments of the invention, a memory with a single rail supply can be converted into a dual rail supply without the need to modify the self-time tracking circuitry and word line drivers because the level shifters are located at the input receivers and output drivers of the memory, thereby simplifying the fabrication process of the memory.

Figure 7:
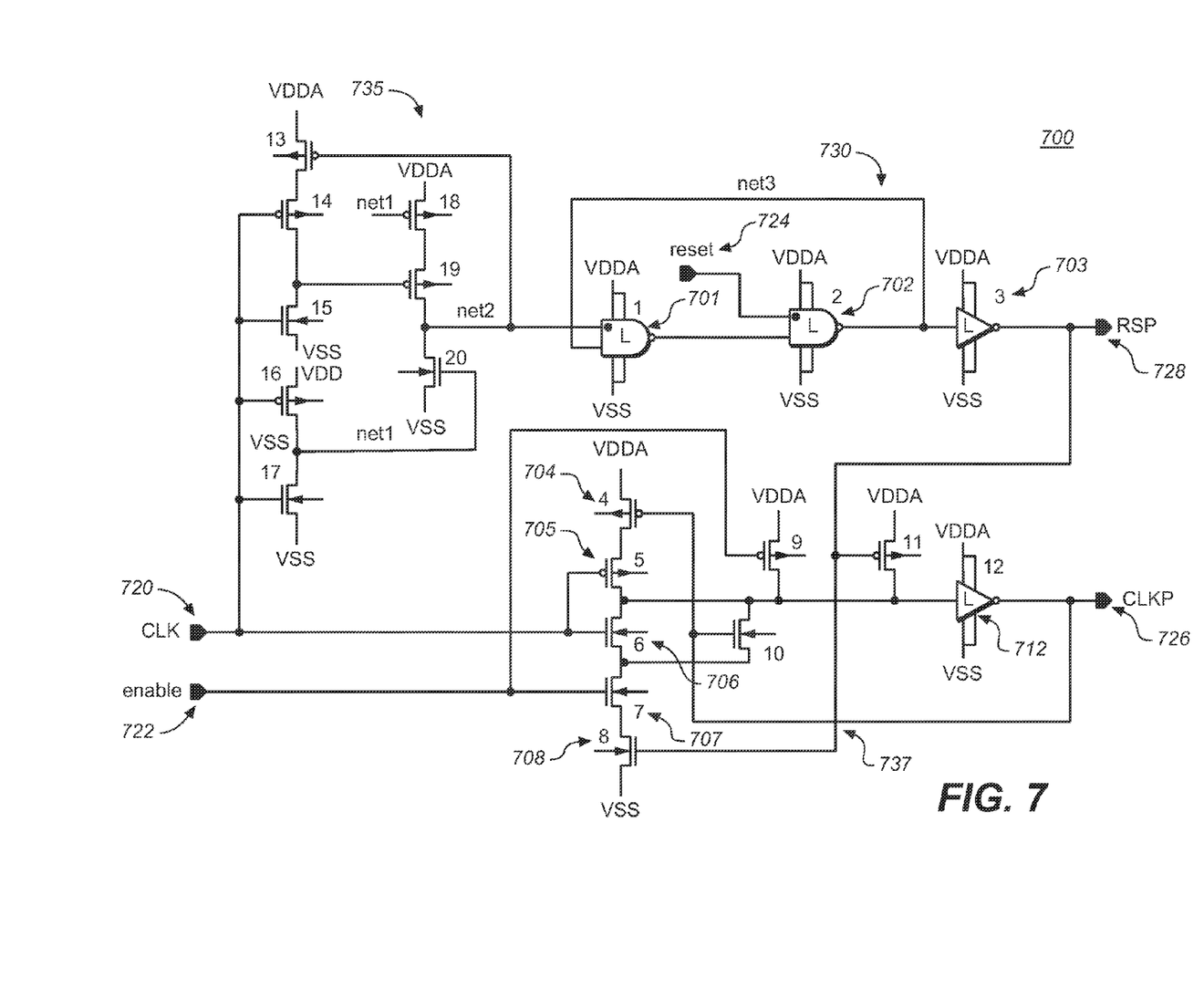
FIG. 7 is a circuit diagram depicting at least a portion of an exemplary clock generator circuit including a level shifter circuit suitable for use, for example, with the illustrative dual rail memory and memory address path depicted in FIGS. 5 and 6, respectively, according to an embodiment of the present invention.

FIG. 7 is a circuit diagram depicting at least a portion of an exemplary clock generator circuit 700 including a level shifter circuit 735 suitable for use, for example, with the illustrative dual rail memory 500 and memory address path 600 depicted in FIGS. 5 and 6, respectively, according to an embodiment of the present invention. A typical processing system operating in a first voltage domain, which in this embodiment is a VDD domain, has a clock signal (CLK) switching between 0 and VDD. When this clock signal is supplied to a memory operating with a dual rail power supply arrangement in accordance with an embodiment of the invention, the clock signal is translated or shifted from the first voltage domain to a second voltage domain, which in this embodiment is a higher VDDA domain. This externally generated clock signal switching between 0 and VDD and is applied to a clock input 720 of the clock generator circuit 700. The clock input 720 is adapted to receive the clock signal CLK, which is translated up to VDDA because most of the periphery of the memory, including the clock input (e.g., as in memory 500) is operating at VDDA.

For example, with reference again to FIG. 6, array voltage (VDDA) domain 605, which includes address latch 630, predecoder 620, row decoder 615, core 610 and input 655 receiving the clock signal (CLK) of exemplary memory 600 operates at VDDA. In this embodiment, a level shifter circuit is integrated into clock generator circuit 700 in a manner that does not add serial delay to the access time. To accomplish this, a level shifter 735 is located outside a critical path of the clock signal. In other words, the level shifter circuit 735 is not located in the time-sensitive circuit path of the clock signal within or outside of clock generator circuit 700. In FIG. 7, the time-sensitive circuit or the critical path of the clock signal is shown as the signal path from clock input 720 to a clock output 726 of a clock circuit 737 in clock generator circuit 700. Clock circuit 737 is operative to receive a rising edge of the external clock signal CLK and to generate an internal clock pulse, CLKP, at the clock output 726 having a pulse width that is a function of a self-time path and is independent of a pulse width of the external clock signal CLK.

Clock generator circuit 700 also includes a reset circuit 730 coupled with the level shifter circuit 735 and clock circuit 737. In accordance with this embodiment, level shifter circuit 735 is located in the circuit path of the reset circuit 730, while the time-sensitive circuit path of the clock signal CLK is free from any delay added by level shifter 735. At input 720, the clock signal CLK is transitioning from 0 to VDD, and at output 726, the clock pulse CLKP is transitioning from 0 to VDDA. As CLK rises, NFET 707 turns on while PFET 705 starts to turn off. This is sufficient to turn on the PFET of inverter 712 (not explicitly shown) to drive the output clock pulse CLKP high, which then completely turns off the pull-up path in the PFET 704 and PFET 705 stack.

In this embodiment, the clock signal CLK is active high and thus requires only single-edge level shifting. During a low state (e.g., VSS) of clock signal CLK at input 720, an enable signal received at input 722 and a reset signal received at input 724 are at a logic high state (e.g., VDDA). The enable signal at input 722 is generated by, for example, an enable latch already operating in the VDDA domain. Prior to the rising edge of clock signal CLK, NFETs 707 and 708, a PFET of inverter 703, and NFET stack of NAND 702 are in an on-state, and net3 (which connects an output of NAND 702 with an input of NAND 701) is low while a reset pulse, RSP, generated at an output 728 of the reset circuit 730, is high. Once the clock signal CLK at input 720 goes to a high (e.g., VDD) state, an NFET 706 and a PFET of inverter 712 are turned on resulting in the clock pulse signal CLKP at output 726 going high (e.g., VDDA). CLKP going high triggers a self-time path (after a prescribed time) of self-time tracking circuitry of, for example exemplary memory 500, which sets reset input 724 to low, thereby making net3 high, and reset pulse RSP at output 728 low, which will thereby reset the clock pulse CLKP to low at output 726. It should be noted that access time over dual rail clock generators is improved in accordance with embodiments of the invention because level shifter circuit 735 is not in the critical path of the clock signal CLK. Further, in this embodiment level shifter circuit 735 is integrated into clock generator circuit 700 at an input of NAND gate 701, but it should be realized that an alternative circuit arrangement could be used to integrate the level shifter into NAND gate 701, for example by building level-shifting logic into the gate.

Once the clock cycle is started and the clock pulse CLKP is propagated to the self-time tracking circuitry, a delay occurs that is associated with the self-time tracking process. The amount of delay is typically a function of an amount of time necessary to perform a read or write operation to the array and may also depend, to some extent, on the size of the array. If the array has excessively long bit lines or excessively long word lines, then more delay is required and the tracking circuitry is designed to track with that delay. A pulse width of clock pulse CLKP is controlled as a function of one or more characteristics of the memory, such as, for example, how long the memory is designed to have the word lines active.

After enough time has passed for either writing to the array or reading and setting the sense amplifier, the self-time tracking circuitry generates a signal (e.g., low) that is sent to the reset input 724 where the reset circuit 730 is operative to reset clock generator circuit 700. When reset circuit 730 receives a low signal at input 724 from the self-time circuitry, net3 of reset circuit 730 generates a high signal which is inverted by inverter 703 to generate a low RSP signal at output 728. This low RSP signal is also used to reset clock circuit 737 and a pre-decoder (not explicitly shown) coupled in parallel with the clock generator circuit 700. The RSP low signal at clock circuit 737 resets the CLKP signal to a low state at output 726. Clock generator circuit 700 stays reset until the external clock signal CLK at input 720 transitions back to a low state.

Clock generator circuit 700 does not re-arm or set for the next clock cycle until the external clock goes back low because clock generator circuit 700 triggers off every rising edge of the clock CLK. In order for reset circuit 730 to determine that the external clock signal CLK went back low, to re-arm the circuit, the clock signal CLK is level shifted in level shifter 735 and sent to NAND gate 701. NAND gates 701 and 702 form a latch which determines when the clock generator circuit 700 is in the armed state. When input 724 goes low, it sets this latch which resets and disables the clock circuit 737. When both the reset input 724 and clock input 720 have returned low, then the latch is reset which re-arms the clock generator circuit 700 to prepare for the next clock cycle.

Figure 8:
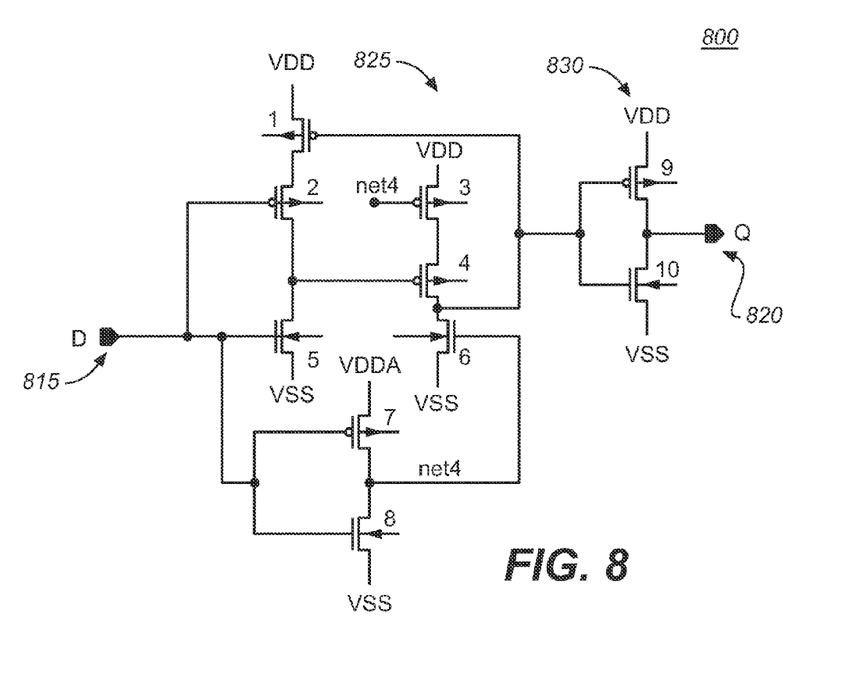
FIG. 8 is a circuit diagram depicting at least a portion of an exemplary output driver with a level shifter for a memory device operating with a dual rail power supply scheme, in accordance with an embodiment of the present invention.

FIG. 8 is a circuit diagram depicting at least a portion of an exemplary output driver 800 with a level shifter for a memory device operating with a dual rail power supply scheme, in accordance with an embodiment of the invention. The output driver 800 is suitable for use, for example, with the illustrative dual rail memory 500 depicted in FIG. 5 (e.g., output driver level shifter circuits 560). Output driver 800 includes a level shifter circuit 825 coupled with an output driver 830 or alternative buffer. Level shifter circuit 825 shifts a data signal, D, received at an input 815 having a first voltage domain level (e.g., higher array VDDA voltage level) and generates an output signal, Q, at output 820 having a second voltage domain level (e.g., lower periphery VDD voltage level).

It should be understood that level shifter circuit 825 can be configured to reduce the impact on access time where there is an asymmetry in a delay for a signal rising to the higher voltage domain as compared to a falling signal. In this exemplary output driver 800, the delay in the rising output and the delay in the falling output are ideally balanced. It should be noted that different level shifter circuits can be used, according to embodiments of the invention, provided the delays are substantially balanced (i.e., tuned). Methodologies for controlling a balance between rising and falling delay are well known in the art.

Level shifter circuit 825 has introduced two additional gate delays resulting in additional path time penalty. However, in this embodiment, because most of memory 500 in which level shifter circuit is used is operating at the VDDA supply (including most of its periphery), memory 500 benefits from operating at a faster performance level when VDDA is greater than VDD, which offsets the additional delay from level shifter circuit 825. It should be noted that control level shifter circuits 555 (shown in FIG. 5) and level shifters 640 (shown in FIG. 6) and the associated input receivers, are arranged similarly to output driver 800, in a manner well known by those skilled in the art. However, in the case of input receivers, for example, level shifter circuit 825 would receive an address at input 815 and would shift the voltage from the VDD domain to the VDDA domain at output 820, and the address input buffer is integrated with the level shifter to form an integrated input buffer circuit. Alternatively, in other embodiments of the invention, level shifter circuit 825 is located at the output of the input receiver, where the integrated input buffer circuit is separated into an input buffer powered by VDD and a level shifter powered by VDDA.

At least a portion of the techniques of embodiments of the invention may be implemented in one or more integrated circuits. In forming integrated circuits, die are typically fabricated in a repeated pattern on a surface of a semiconductor wafer. Individual die are cut or diced from the wafer, then packaged as integrated circuits. In packaging the dies, individual die are attached to a receiving substrate according to methods of the invention. One skilled in the art would know how to dice wafers to produce integrated circuits. Integrated circuits so manufactured are considered part of this invention.

An integrated circuit formed in accordance with interconnection techniques of embodiments of the invention can be employed in essentially any application and/or electronic system utilizing memory, without regard to whether the memory is embedded or standalone (e.g., discrete memory). Suitable systems for implementing the invention may include, but are not limited to, personal computers, communication networks, portable communications devices (e.g., cell phones), etc. Systems incorporating such integrated circuits are considered part of this invention. Given the teachings of the invention provided herein, one of ordinary skill in the art will be able to contemplate other implementations and applications of the embodiments of the invention.

The embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A dual rail memory operable at a first voltage and a second voltage, the memory comprising:
   at least one input circuit operable to receive at least a first input signal referenced to the first voltage and operable to generate a second input signal referenced to the second voltage;
   at least one output circuit operable to receive at least a first output signal referenced to the second voltage and to generate a second output signal referenced to the first voltage; and
   a clock generator circuit coupled to the at least one input circuit, the clock generator circuit operable to receive a first clock signal referenced to the first voltage and to generate a second clock signal referenced to the second voltage, a logic state of the second clock signal being a function of a logic state of the first clock signal.

2. The memory of claim 1, wherein the first voltage is higher than the second voltage.

3. The memory of claim 1, wherein the first voltage is lower than the second voltage.

4. The memory of claim 1, wherein the at least one input circuit comprises at least one input receiver.

5. The memory of claim 4, wherein the at least one input circuit comprises at least one level shifter.

6. The memory of claim 1, wherein the at least one input circuit comprises at least one level shifter circuit coupled between the at least one input circuit and at least one latch circuit.

7. The memory of claim 1, wherein the at least one input circuit comprises at least one level shifter circuit coupled in an asynchronous delay path of the at least one input signal.

8. The memory of claim 1, wherein the at least one output circuit comprises at least one output driver.

9. The memory of claim 8, wherein the at least one output circuit comprises at least one level shifter circuit.

10. The memory of claim 1, wherein the at least one input circuit comprises at least one of an address input adapted to receive one or more address signals, a data input adapted to receive one or more data signals, and a control input adapted to receive one or more control signal signals.

11. The memory of claim 1, wherein the clock generator circuit further comprises:
 a time-sensitive circuit;
 a level shifter circuit; and
 a reset circuit coupled to the time-sensitive circuit and to the level shifter circuit.

12. The memory of claim 11, further comprising a self-timing circuit operable at the second voltage and operable to send a signal to the reset circuit.

13. The memory of claim 12, wherein the reset circuit further comprises an input adapted to receive the signal from the self-timing circuit to reset the second clock signal.

14. The memory of claim 1, wherein at least a portion of the memory is fabricated in at least one integrated circuit.

15. A dual rail memory operable at a first voltage and a second voltage, the memory comprising:
 an input receiver circuit operable to receive at least a first input signal referenced to the first voltage;
 at least a first level shifter circuit coupled with the input receiver and operable to generate at least a second input signal referenced to the second voltage, the second input signal having a logic state that is a function of a logic state of the first input signal;
 an output driver circuit operable to generate at least a first output signal referenced to the first voltage;
 at least a second level shifter circuit coupled with the output driver circuit and operable to generate at least a second output signal referenced to the second voltage, a logic state of the second output signal being a function of a logic state of the first output signal;
 a clock generator circuit comprising:
  a reset circuit;
  a third level shifter circuit coupled with the reset circuit; and
  a clock circuit coupled with the reset circuit and the third level shifter circuit, the clock generator circuit having a clock output coupled with the input receiver circuit, the clock generator circuit operable to receive a first clock signal referenced to the first voltage and to generate a second clock signal referenced to the second voltage at the clock output, the second clock signal having a logic state that is a function of a logic state of the first clock signal.

16. The memory of claim 15, wherein the first voltage is higher than the second voltage.

17. The memory of claim 15, wherein the first voltage is lower than the second voltage.

18. The memory of claim 15, further comprising a self-timing circuit operable at the second voltage and operable to send a signal to the reset circuit.

19. The memory of claim 18, wherein the reset circuit further comprises an input adapted to receive the signal from the self-timing circuit to reset the second clock signal.

20. The memory of claim 15, wherein the input receiver circuit comprise at least one of an address input adapted to receive one or more address signals, a data input adapted to receive one or more data signals, and a control input adapted to receive one or more control signal signals.

21. The memory of claim 15, wherein at least a portion of the memory is fabricated in at least one integrated circuit.

* * * * *